Dec. 8, 1931.  C. S. BRAGG ET AL  1,835,752
BRAKE MECHANISM FOR AUTOMOTIVE VEHICLES
Filed Oct. 12, 1927   5 Sheets-Sheet 2
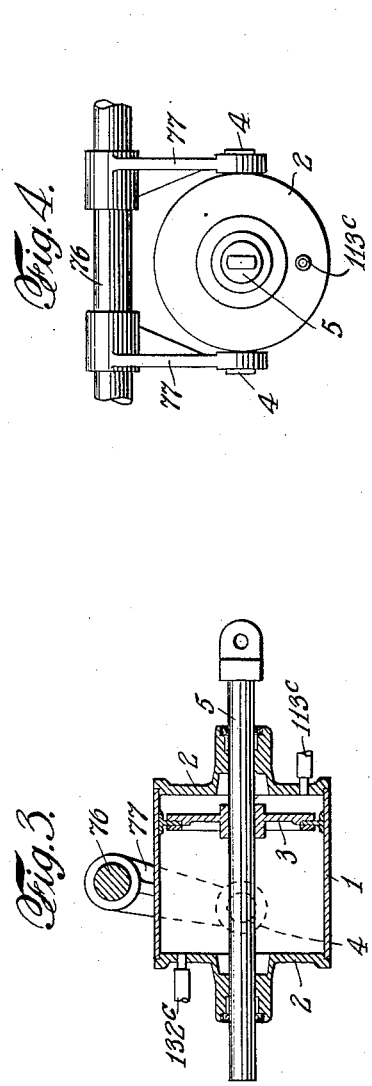
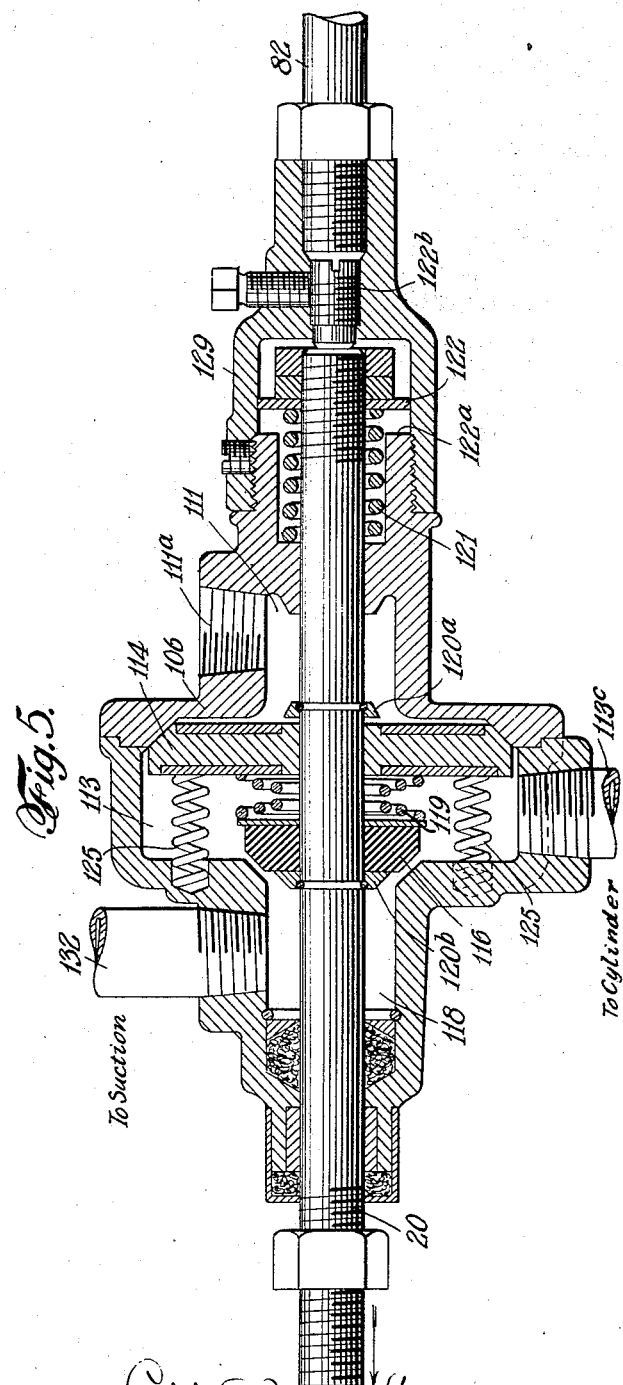

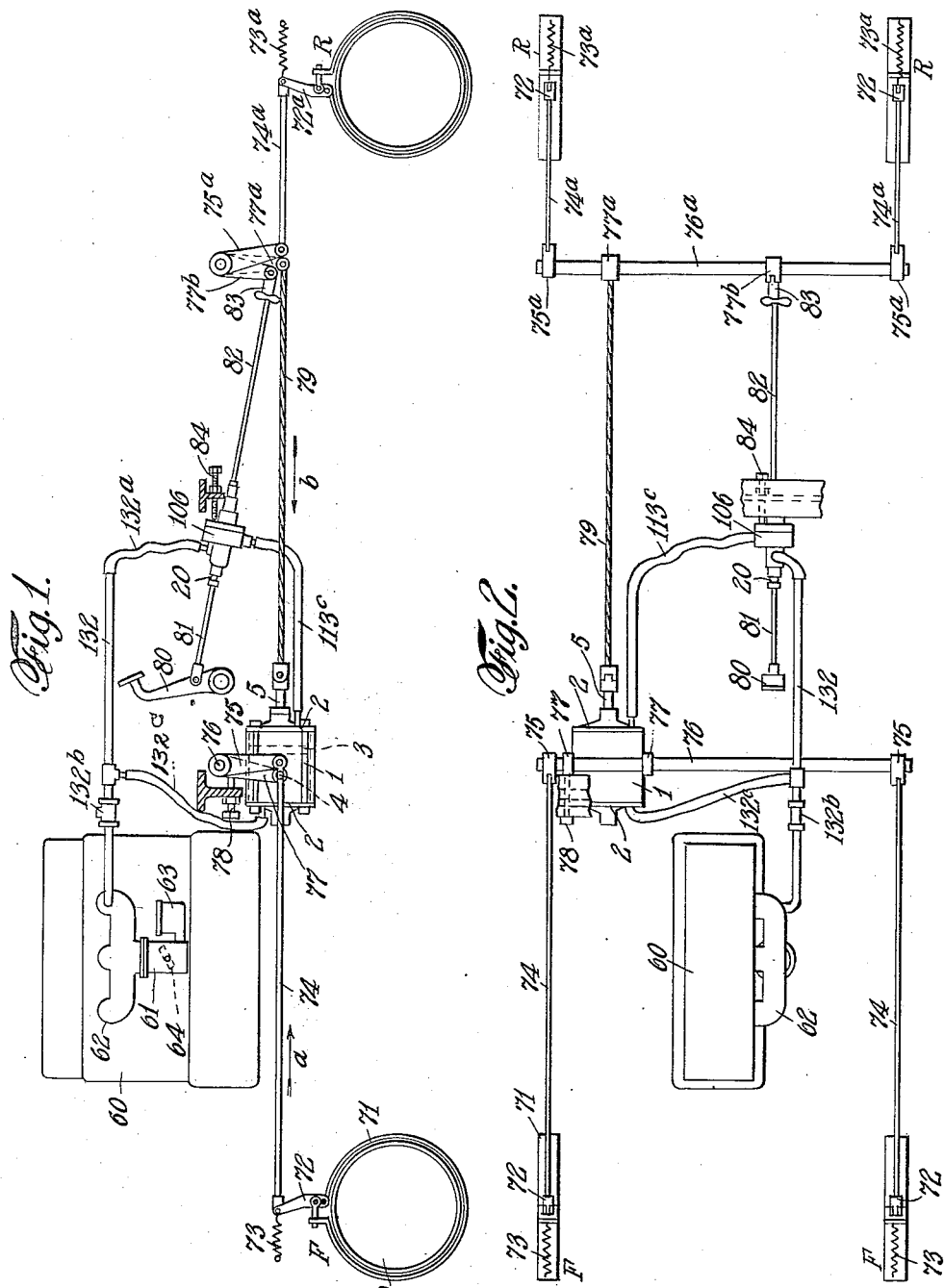

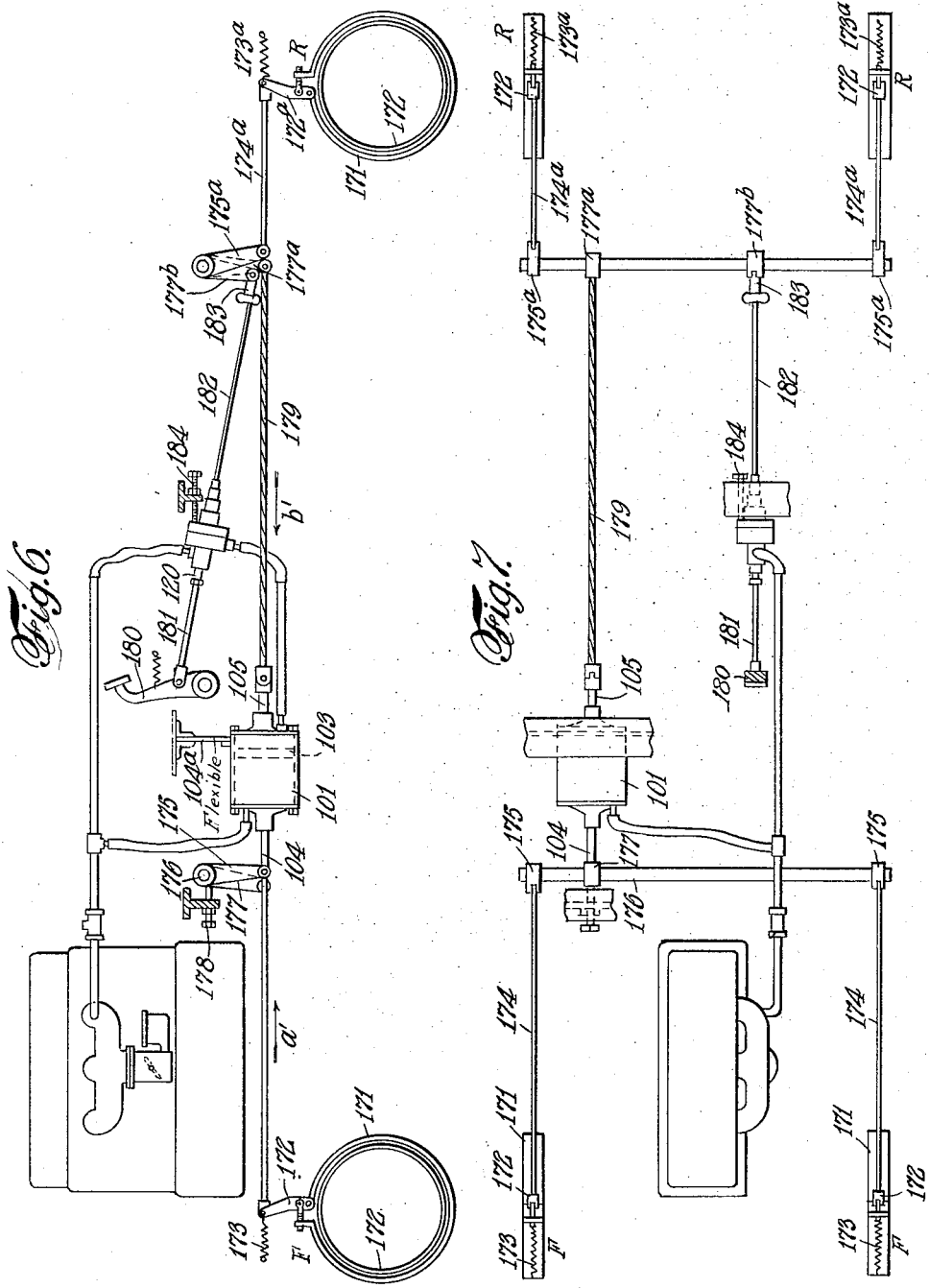

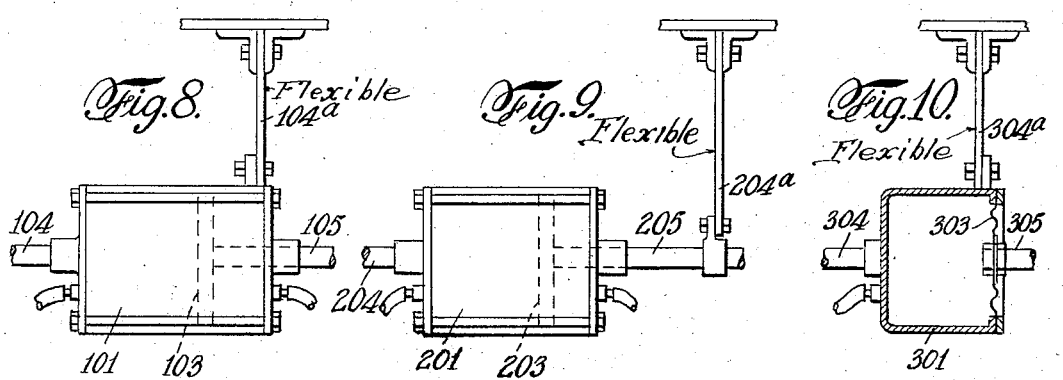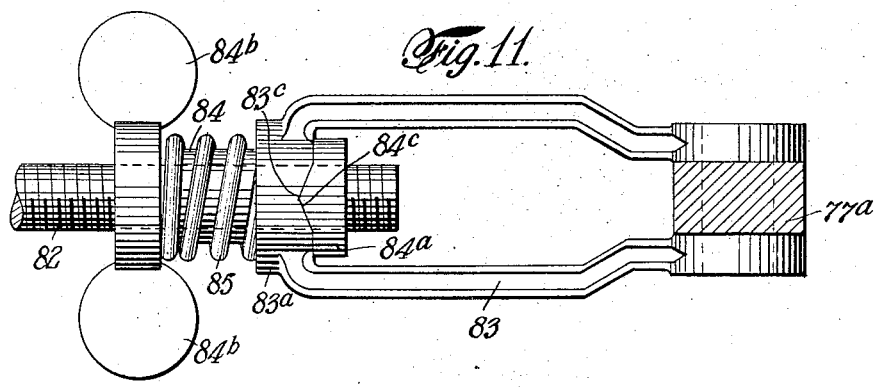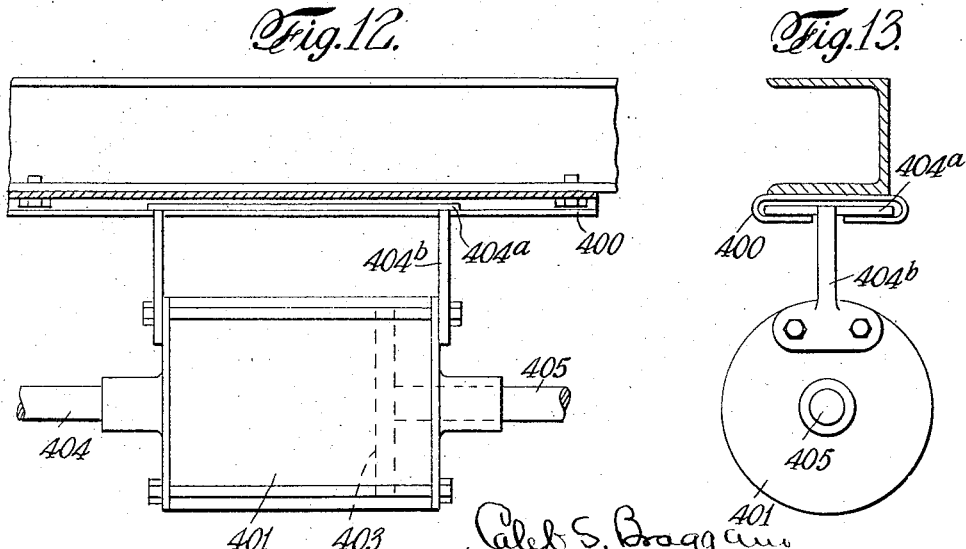

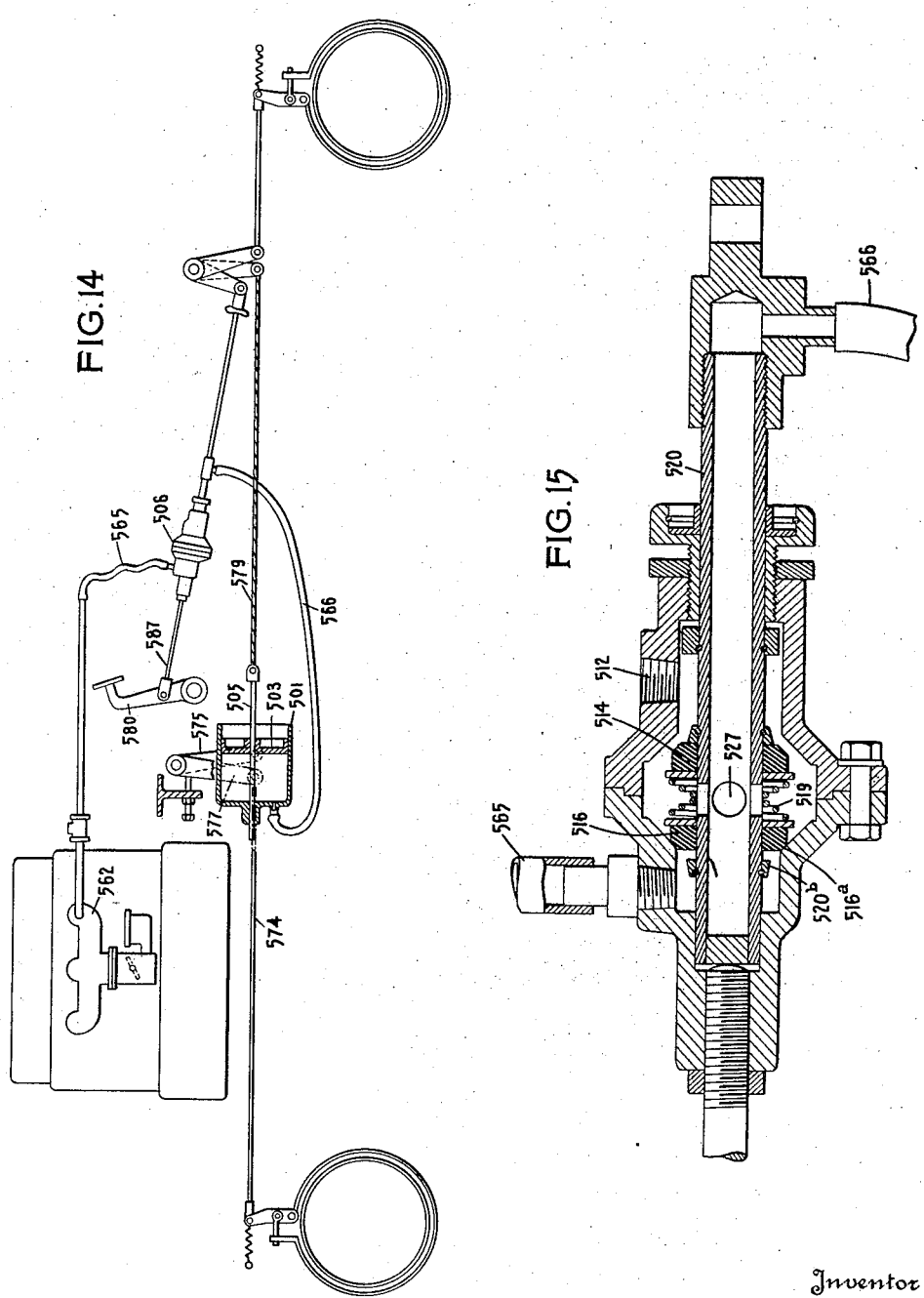

Patented Dec. 8, 1931

1,835,752

UNITED STATES PATENT OFFICE

CALEB S. BRAGG, OF PALM BEACH, FLORIDA, AND VICTOR W. KLIESRATH, OF PORT WASHINGTON, NEW YORK, ASSIGNORS TO BRAGG-KLIESRATH CORPORATION, OF LONG ISLAND CITY, NEW YORK, A CORPORATION OF NEW YORK

BRAKE MECHANISM FOR AUTOMOTIVE VEHICLES

Application filed October 12, 1927. Serial No. 225,633.

Our invention consists in the novel features hereinafter described, reference being had to the accompanying drawings, which illustrate one embodiment and a slight modification thereof, selected by us for purposes of illustration, and the said invention is fully disclosed in the following description and claims.

Where brake mechanisms are provided for a plurality of pairs of wheels of an automotive vehicle, including the power driven wheels, usually the rear wheels, and the front wheels, usually the steering wheels of the vehicle, it is customary to so arrange the relative sizes of the brakes, or the leverages between them and the operating means, that the front wheel brakes cannot be locked on the average dry pavement or roadway when the brake mechanisms are applied, as the locking of the front wheels materially affects the steering of the vehicle, and is more likely to cause serious accident than the locking of the rear wheels. As the greater portion of the load carried by the vehicle is borne by the rear wheels, it necessarily follows that more power is required to lock the rear wheels when the vehicle is loaded than when empty, and as only a relatively small proportion of the load is carried on the front wheels, it requires relatively but a small amount of additional power to lock the front wheels when the vehicle is loaded than is required when the vehicle is empty. With such an arrangement it necessarily follows that a very small proportion of the braking power can be transmitted to the brakes of the front wheels, and, therefore, the front wheels have comparatively little braking effect in making the ordinary or average stops, and the brake mechanisms of the front wheels only become effective in emergency stops, at which times the rear wheels of the vehicle will often be locked, at which times their braking effect is materially reduced and will more than offset the gain in the braking effect exerted on the front wheels.

The object of our invention is to provide brake mechanism for a plurality of pairs of wheels of an automotive vehicle, including the steering wheels and traction wheels, all of which are simultaneously applied by a power actuator comprising one cylinder and a single piston therein, the actuator being operatively connected with the brake mechanisms for all the wheels and being preferably operated by a substantially constant differential of fluid pressures, which may be conveniently obtained by utilizing the differential of pressures between the partial vacuum obtained by a connection to the intake manifold of the internal combustion engine for propelling the vehicle between the throttle valve and the engine cylinders, the degree of rarefication being constant when the throttle valve is closed, which is the correct position when the brakes are to be applied, and atmospheric pressure for example, the capacity of the actuator or the leverages in the connections between it and the brake mechanisms, or both, being such that the brake mechanisms for both the front or steering wheels and the rear or driving wheels can be applied by the actuator simultaneously to the full extent of its power without ordinarily locking the front or steering wheels upon the average dry pavement or roadway, and without locking the rear or driving wheels upon the average dry pavement or roadway, even when the vehicle is lightly loaded, means being provided whereby the physical force of the operator may be added to the brake mechanisms for the rear or driving wheels only, to supplement the action of the power actuator in stopping the vehicle when heavily loaded, or in making emergency stops, and to apply the brakes for the rear or driving wheels in case of failure of power, the brake mechanisms for the front wheels being applied only by means of the power actuator.

In the operation of brake mechanism embodying our invention, the average stop of the vehicle is effected by power alone without the possibility of locking either the steering wheels or the driving wheels on the average pavement when dry, and a larger proportion of the braking action is effected by the steering wheel brake mechanisms than is effected by the customary linkage arrangement previously described, as the full braking power of the actuator may be transmitted to the steering wheels simultaneously with the application of the brakes to the driving wheels, the physical force of the operator being applied only for emergency stops or excessive loads, and in such cases being applied only to the brake mechanisms for the rear or driving wheels, which, especially in the case of trucks or buses carry the greater part of the load of the vehicle and its contents, and therefore more power is required to effectively apply the rear wheel brake mechanisms when the vehicle is heavily laden than when it is light. In the operation of brake mechanism embodying our invention, the vehicle may be stopped more quickly with less danger of locking the wheels even on wet pavements, and longer wear of the brakes and tires will necessarily result.

Our invention also provides for predetermined distribution of the power applied to the several brake mechanisms, and we prefer to make the cylinder of the power actuator and consequently the piston stroke sufficiently long to compensate for normal wear of the braking surfaces, which permits the brake mechanisms to be used for longer periods without adjustment. As the physical force of the operator is only needed to compensate for additional loads, the leaverage ratios in the connections between the operator operated part and the rear wheel brake mechanisms may be so arranged, that the operator operated part, as for example the foot operated pedal lever, will not reach its limit of movement during a considerably longer period of use of the brake mechanisms, and we preferably provide adjusting means in the said connections so that only one adjustment will ordinarily be necessary, to wit, the adjustment of said connections between the operator operated part and the rear wheel brake mechanisms, where a sufficient power stroke for the actuator is provided.

In the preferred form of our invention herein shown and described both the cylinder and the piston are movable with respect to the chassis of the vehicle, the cylinder being connected with one set of brake mechanisms, as those for the front or steering wheels, while the piston rod is connected with the other set of brake mechanisms, as those for the rear or driving wheels, so that when a differential of pressure exists within the cylinder the piston will be moved in one direction and the cylinder in the opposite direction to apply both sets of brakes by power. With such a construction the power actuator will exert twice as much force upon the braking mechanism as a fixed cylinder and movable piston of equal size; this by virtue of the fact that the pressure of the atmosphere is acting both upon the cylinder and the piston, the area of each of said parts exposed to said pressure being substantially equal. The total amount of useful work performed by both types of construction is the same, inasmuch as the total volume of air evacuated from the actuator is the same; however, with the suggested construction the diameter of the actuator may be appreciably reduced and thus made more compact without, however, reducing the total force or load upon the brake mechanism. With a fixed cylinder the entire load must necessarily be derived from the piston, and in order to obtain a force equal to that derived from the suggested construction it is necessary to double the area of the piston; this by virtue of the fact that the total force derived from the piston is equal to the product of the area of the piston times the atmospheric pressure, the latter being substantially a constant. The operator operated part is connected to the brake mechanisms for the rear wheels only, and the controlling valve mechanism for the power actuator is located in said connection and is operable by the operator operated part, a limited amount of lost motion being provided to enable the valve mechanism to be operated to apply all the brake mechanisms by the power of the actuator, before the operator will have to add any more of his physical force to the rear wheel brake mechanism than is necessary to operate the valve mechanism and said connections being provided with adjusting means as previously stated to prevent the operator operated part from reaching its limit of movement in a direction to apply the brakes, and suitable stops being provided to limit the movement of the brake mechanisms in returning to their released positions.

Our invention also comprises certain novel features of construction and combination of parts hereinafter described and fully pointed out in the claims.

In the accompanying drawings.

Fig. 1 is a diagrammatic view in elevation representing an installation of brake mechanism in an automotive vehicle embodying our invention.

Fig. 2 is a diagrammatic plan view of the same.

Fig. 3 is a detail sectional view of the power actuator showing the means for movably supporting the cylinder thereof and for connecting it with one set of brake mechanisms.

Fig. 4 is an end elevation of the actuator showing its supporting connections.

Fig. 5 is an enlarged detail sectional view of one form of controlling valve mechanism for the actuator which we may employ.

Fig. 6 is a view similar to Fig. 1 showing a slight modification of our invention.

Fig. 7 is a diagrammatic plan view of the installation shown in Fig. 6.

Fig. 8 is a detail elevation of the power actuator and means for movably supporting the cylinder thereof.

Fig. 9 is a similar view showing the piston movably supported.

Fig. 10 is a view similar to Fig. 8 showing a diaphragm type of actuator.

Fig. 11 is a detail view of a convenient form of adjusting means which may be employed in the connections between the operator operated part and the rear wheel brake mechanisms.

Figs. 12 and 13 are detail views showing a modified form of means for movably supporting the actuator.

Fig. 14 is a diagrammatic view showing a modified arrangement with the actuator piston submerged in atmosphere when in normal or retracted position, the cylinder being swung on pivoted arms as in the construction of Fig. 1.

Fig. 15 is a detail sectional view of the valve mechanism for controlling an actuator of this type and is disclosed generally in our application filed October 8, 1927, Serial No. 224,841.

In the form of our invention illustrated in Figs. 1 to 5 inclusive, in which Figs. 1 and 2 represent respectively a diagrammatic elevation and plan of an installation of brake mechanisms embodying our invention in an automotive vehicle, 60 represents the internal combustion engine for propelling the vehicle, having the usual suction passage comprising the vertical portion, 61, and intake manifold, 62, for supplying the charges to the cylinders of the engine from the carburetor, 63, under the control of the usual throttle valve, 64, interposed between the carburetor and the cylinders of the engine. The front or steering wheel brake mechanisms are indicated at F, F, and the rear or driven wheel brake mechanisms at R, R. These brake mechanisms may be of any desired type, but are shown for convenience in this instance as comprising each a brake drum, 70, brake band, 71, and brake operating lever, 72, provided with the usual retracting spring, 73. The front levers, 72, of the front wheel brake mechanisms are connected by links, 74, 74, with arms 75, 75, on a rock shaft, 76, secured to the chassis of the vehicle, and provided in this instance with actuating arms, 77, 77. The levers, 72ª, of the rear wheel brake mechanisms are connected by links, 74ª, 74ª, with arms, 75ª, 75ª, on a similar rock shaft 76ª, provided with actuating arms, 77ª and 77ᵇ.

The power actuator shown in these figures consists preferably of a cylinder, 1, closed at both ends by heads, 2, 2, and provided with a piston, 3, the cylinder being of sufficient length to provide a long stroke for the piston sufficient to compensate for considerable wear of the braking surfaces and their connections without the necessity of frequent adjustments of the brake mechanism, which adjustments are furthermore simplified by the equalization effected between the front and rear brake mechanisms through the cylinder and piston. The cylinder of the actuator is preferably connected with one set of brake mechanisms, and the piston is connected with the other set of brake mechanisms, the cylinder and piston being movable with the brake mechanism and movable with respect to the chassis of the vehicle. In this instance we have shown the cylinder provided at opposite sides with trunnions, 4, 4, which pivotally engage bearing apertures in the ends of the actuating arms, 77, on the rock shaft, 76, thereby supporting the cylinder, so that it can move with respect to the chassis, and at the same time operatively connecting it with the brake mechanisms for the front wheels. In this instance we have shown an adjustable stop, 78, in the form of a set screw threaded through a part connected with the chassis of the vehicle and engaging one of the arms, 77, for adjustably limiting the forward movement of said arm and cylinder under the action of the retracting springs, 73, and determining the positions of the front wheel brake mechanisms and connected parts when in released or off position.

The piston of the actuator is provided with a piston rod, 5, which is connected by a link, 79, which may be in the form of a cable, as shown in Fig. 1, with the actuating arm, 77a, on the rock shaft connected with the rear wheel brake mechanisms, and it will be understood that when a differential of pressures exists in the cylinder of the actuator, the cylinder will be moved in the direction of the arrow, a, Fig. 1, and the piston will be moved in the direction of the arrow, b, to simultaneously actuate the front and rear wheel brake mechanisms, and as before stated the power of the actuator and the leverages at which it is applied to both sets of brake mechanisms is such that the front or steering wheel brake mechanism, and preferably the brake mechanism for the rear wheels, will not lock the wheels of the vehicle to which they are applied on ordinary dry pavement or roadway. This arrangement also secures a substantial equalization of the power exerted by the actuator on the front and rear wheel brake mechanisms, but obviously the leverages at which the power is applied to the several brake mechanisms may be varied as necessary, to secure the desired result.

The controlling valve mechanism for the power actuator forms no part of this invention and may be of any kind, but we prefer to show, for purposes of illustration a type of valve mechanism which builds up a resistance to be overcome by the operator in proportion to the amount of power exerted by the actuator, and the leverages to the rear wheels are such as to take this force into consideration when such a type of valve mechanism is used. The valve mechanism is shown in this instance as located in the linkage which connects the operator operated part, in this instance a pedal lever indicated at 80, with the actuating arm, 77ᵇ, on the rock shaft, 76ª, for the rear wheel brakes only. The valve mechanism comprises a valve casing and valves movable with and with respect thereto, and operatively connected with a valve actuating part having a limited amount of relative movement of lost motion with respect to the casing sufficient to operate the valve mechanism, so that by taking up this lost motion the full physical force of the operator may be applied to the rear wheel brakes only in addition to that of the actuator, or to operate the rear wheel brake mechanisms only, in case of failure of power. In this instance we have shown a specific form of valve mechanism illustrated in detail in Fig. 5, which may be conveniently and desirably employed. The specific construction of this valve mechanism is not claimed herein as it forms the subject matter of our former application for Letters Patent of the United States, filed June 17, 1927, and given Serial No. 199,477, and it will therefore be described only sufficiently to enable the operation of the power actuator to be understood. The valve mechanism comprises a valve casing, 106, provided with a centrally located valve chamber, 113, containing a normally closed higher pressure or air inlet valve, 114, of large diameter, and having its opposite faces substantially equal, and a small lower pressure or suction valve, 116. The valve casing is provided with a higher pressure chamber, 111, on the outer side of the valve, 114, communicating with the atmosphere (or other source of higher pressure fluid) by an aperture, 111$^a$, and said casing is also provided with an exhaust or suction chamber, 118, on the outer side of the valve, 116, which in this instance exhausts the higher fluid pressure into the suction passage of the engine between the throttle valve and the engine cylinder by means of a suction pipe, 132, having a flexible portion, 132$^a$, said pipe being preferably provided with a check valve, 132$^b$. The outer face of the valve, 114, is subjected at all times to the higher pressure fluid, while the inner face is subjected to the highest pressure within the actuator cylinder to which it is connected by a pipe 113$^c$, having a flexible portion, and extending from the valve chamber, 113, to the cylinder, 1, in rear of the piston. The valve, 114, is normally held closed by yielding resistance means, as a spring, or springs, 125, interposed between a portion of the valve casing and the inner face, said resistance means being nearly counterbalanced by the pressure of the atmosphere or other higher pressure fluid on the outer face of the valve when the differential of pressures on opposite faces of the valve are at maximum, and having sufficient power to offer material resistance to the movement of the valve away from its seat when the fluid pressures on opposite faces of the valve are equalized. The suction valve is provided with a spring or other yielding means, 119, of sufficient tension to seat it and offer little resistance to open the valve. 20 represents a valve actuating part extending longitudinally through the valve casing and valves and connected in such manner as to open one valve after permitting the other to seat when moved in either direction, and to permit both valves to be seated simultaneously, this being accomplished in the present instance by collars, 120$^a$ and 120$^b$. Yielding retracting means sufficient to overcome the spring, 119, are provided for normally holding the suction or lower pressure valve, 116, in open position when the actuator piston and cylinder are in their released or retracted positions, and in this instance the valve casing is shown provided with a retracting spring, 121, interposed between the casing and a flange or collar, 122, on the valve actuating part, 20, which will engage a shoulder, 122$^a$, when the valve actuating part is moved in the direction of the arrow. Fig. 5, far enough to open the valve, 114, after permitting the valve, 116, to seat, thus limiting the lost motion between the valve actuating part and the valve casing, and permitting the physical force of the operator to be applied to the brake mechanism connected therewith, and the relative movements between said parts in the opposite direction is limited by a set screw, 122$^b$, in a cap, 129, secured to the valve casing. The valve actuating part, 20, is in this instance connected with the foot lever, 80, by a solid link, 81, and the valve casing, 106, is connected by a solid link, 82, with the actuating arm, 77$^b$, on the rock shaft for the rear wheel brake mechanisms. We provide an adjustable stop for arresting the return movement of the foot pedal and valve casing when in released position, and in this instance we have shown a set screw, 84, secured to a part connected with the chassis of the vehicle and engaging the valve casing, 106, for this purpose. A suitable adjusting device which for the purpose may be a turn buckle or its equivalent, indicated at 83, Fig. 1, is interposed in the connections between the valve casing, 106, and the actuating arm, 77$^b$, for adjustably arresting the return movement of the rear wheel brake mechanisms.

We prefer to maintain the piston of the actuator when in retracted position, exposed on both faces to the lower pressure fluid, and in this instance the forward end of the cylinder is connected by a branch pipe, 132$^c$, with the suction pipe, 132, independently of the valve mechanism, so that the cylinder forward of the piston is at all times connected with the suction passage of the engine, and as the suction valve, 116, is normally held open when the parts are in the released or retracted position, as shown in Fig. 5, the portion of the cylinder in rear of the piston will be connected with the suction passage of the engine, thus submerging the piston in vacuum.

Assuming that the engine is running and a state of rarefication is maintained in the cylinder on both sides of the piston, to apply the brake mechanism, the operator will place his foot on the pedal lever, 80, and depress it, thereby permitting the suction valve, 116, to close and thereafter opening the inlet valve, 114, the initial resistance to the movement of the operator operated part being comparatively slight, as the resistance springs, 125, are nearly counterbalanced by the pressure of the higher pressure fluid on the outer face of the valve, 114. As soon as the valve, 114, is opened, the higher pressure fluid, in this case air at atmospheric pressure, will enter the valve chamber, 113, and the portion of the cylinder in rear of the piston, building up pressure in that portion of the cylinder and effecting a movement of the cylinder in the direction of the arrow, $a$, in Fig. 1, and a movement of the piston in the direction of the arrow, $b$, Fig. 1, and applying both sets of brake mechanisms. As the pressure builds up within the cylinder to the rear of the piston and within the chamber, 113, tending to equalize the pressure on opposite faces of the valve, 114, the force of the resistance springs, 125, will be transferred to the operator operated part in substantial proportion to the decrease in the differential of fluid pressures on the opposite faces of the valve, 114, so that it requires increased pressure of the operator's foot to keep the valve, 114, open, and he is thus enabled to determine very accurately the power exerted by the actuator upon the brake mechanisms, which will be at maximum when the fluid pressure on opposite faces of the valve, 114, are equalized. If the operator desires to hold the brakes as applied by power, he will stop the forward movement of the foot pedal which will permit the valve casing moving with the piston to close the valve, 114, which will transfer the pressure of the resistance springs, 125, to the valve seat in the valve casing, and relieve the operator of the necessity of sustaining this pressure. To release the brakes the operator will release the pressure on the foot pedal, or remove his foot therefrom, and permit the retracting spring, 121, to move the valve actuating part, 20, rearwardly sufficiently to open the suction valve, 116, the inlet valve, 114, remaining closed. The air previously admitted passes through pipe, 132, into pipe, 132$^c$, effecting an equalization of pressures on opposite faces of the actuator piston, while said air is simultaneously started to be withdrawn through the pipe, 132$^b$, from the cylinder on both sides of the piston, permitting the return of the piston, cylinder and brake mechanisms to their normal position under the action of their retracting springs. The brakes can be re-applied by depressing the foot pedal so as to close the suction valve and open the higher pressure inlet valve. If the operator desires to add more of his physical strength than the force required to operate the valve mechanism to the rear wheel brakes, he may depress the foot lever sufficiently to take up the lost motion between the valve actuating part and the valve casing, when he may apply his physical power directly to the rear wheel brake mechanisms only, as in compensating for additional loading of the vehicle or in making emergency stops, without in any way increasing the braking force applied to the front wheels, and it will be obvious that he may also, by taking up this lost motion, apply the rear wheel brake mechanisms by physical force alone in case of failure of power, in which case the first part of the movement would place the valves in position to vent the cylinder, which would be necessary if the arm, 77$^a$, were connected to the piston rod by an unyielding connection. If this link, 79, is a cable, as shown in Fig. 1, the operator may apply the rear wheel brakes by physical force in case of failure of power without operating the piston of the actuator, but in either case the physical force of the operator can only be applied to the rear wheel brake mechanisms.

In Figs. 6, 7 and 8, we have illustrated a slight modification of our invention in which the parts corresponding to those in Figs. 1 to 5 inclusive are given the same reference numerals with the addition of 100, to avoid unnecessary repetition. In this form of our invention the cylinder, 101, of the power actuator is connected by a link, 104, with the actuating arm, 177, on the rock shaft, 176, with which the front wheel brake mechanisms are connected in the same manner as before described, the piston rod, 105, being connected by a link, or cable, 179, with the rear wheel brake mechanism as before described. Where the actuator is sufficiently light, it might be supported entirely by the connecting rods, or links, 104 and 179, but we prefer to connect the cylinder with the chassis of the vehicle so as to support the weight of the actuator while permitting the cylinder to move longitudinally in the direction of the arrow $a^1$ Fig. 6, while the piston will move in the direction of the arrow, $b^1$. In this instance we have shown the cylinder of the actuator movably supported from the chassis frame by a flexible strap, 104$^a$, secured to the cylinder and to a part of the chassis, and preferably formed of rubber having sufficient resiliency to permit the necessary movements of the cylinder with respect to the chassis. It is obvious that where it is necessary to support the weight of the actuator from the chassis the supporting member may be attached either to the cylinder or to the piston. In Fig. 9 for example, we have shown a construction similar to that illustrated in Fig. 8, except that the flexible strap, here indicated at 204ª, is attached to a collar 204ᵇ, secured to the piston rod, and hence to the piston.

It is also obvious that we may employ an actuator of the diaphragm type instead of the cylinder and piston type, if desired, in carrying out our invention. In Fig. 10 for example, we have shown an actuator comprising a casing, 301, closed at both ends, supported movably from the chassis by a flexible strap, 304ª, for example, and provided with a diaphragm, 303, having its marginal portions in sealing engagement with the casing, the casing being connected to one set of brake mechanisms, and the diaphragm to the other set of brake mechanisms, as by the links, 304 and 305 respectively, and the interior of the casing being connected with sources of higher and lower fluid pressures and controlled by the valve mechanism in the same manner as hereinbefore described.

It is also obvious that the actuator may be supported by a non-flexible support having a sliding engagement with the chassis. Such a construction is illustrated for example in Figs. 12 and 13, in which a portion of the chassis frame is shown provided with a horizontal guide, 400, to receive a slide, 404ª, provided with a bracket, 404ᵇ, connected in this instance to the cylinder, 401, of an actuator of the cylinder and piston type, to support the actuator, while permitting the movements of the cylinder and piston with respect to each other and to the chassis as previously described, the piston being connected to one set of brakes and the cylinder to the other according to the position with respect to the chassis, it being obvious that the cylinder could be connected with either the steering wheel brakes or the driving wheel brakes as desired, and the piston connected with the other set. The operation of this embodiment of our invention will be the same as that previously described with reference to Figs. 1 to 5 inclusive.

It will be seen that in all of the embodiments of our invention herein shown and described, one adjustment, which is located in the connections between the valve mechanism and the rear brake mechanisms will maintain the parts in operative condition and compensate for the normal wear of the brake linings for a long period and until the brake levers assume inefficient angles or until it becomes necessary to reline the brake. The length of the cylinder and the consequent stroke of the piston are such as to compensate for the wear of both the front and rear brakes for a long period, and maintain the predetermined pressure to each, and compensate for the unequal wear of the linings of the front and rear wheel brakes. Should the rear brakes wear sufficiently to cause the foot pedal lever to reach the limit of its forward movement, usually determined by the pedal striking the floor board, it is only necessary to take up or shorten the connection between the valve mechanism and the rear brake mechanisms, which can be conveniently done by the adjusting device or turn buckle, indicated at 83 in Figs. 1 and 2, and 183 in Figs. 6 and 7, which in connection with the stop, 84, determines the released or off position of the rear brakes. The released position for the front brakes may be altered when desired by the adjustment of the set screw indicated at 78, in Fig. 1 and 178 in Figs. 6 and 7.

In Fig. 11, we have illustrated for purposes of explanation a form of turn buckle which may be conveniently used for tightening the connection between the valve casing and the actuating arm on the rock shaft for the rear wheel brake mechanisms, to which it is connected by the link rod, 82. This turn buckle comprises a yoke, 83, pivotally secured to the arm, 77ª, and having a collar, 83ª, through which extends a rotatable sleeve, 84, threaded internally and engaging a threaded portion of the link rod, 82, said sleeve being provided with a flange, or collar, 84ª, engaging the inner face of the collar, 83ª, of the yoke, and the outer end of the sleeve is provided with wings, 84ᵇ, or other means to enable it to be rotated. The flange 84ª, and the collar, 83ª, are provided the one with a recess and the other with a slight projection as 84ᶜ, to engage a recess indicated at 83ᶜ, and a spring, 85, is interposed between the sleeve and yoke to hold the said projection and recess in engagement with each other. The necessary adjustment of the rod, 82, for the purpose previously stated, may be obtained by rotating the sleeve, 84, upon the rod. The construction of this turn buckle forms no part of our present invention, however, and is not claimed herein, and it is to be understood that any other form of turn buckle or equivalent adjusting means may be employed to shorten the rod, 82, for example, when such adjustment is desired or necessary.

For the purpose of clearly disclosing an arrangement where the piston of the actuator is submerged in atmosphere we have illustrated in Figs. 14 and 15 such a modified arrangement with the parts corresponding to those in Fig. 1 given the same reference characters with the addition of 500. As will be noted from an inspection of Fig. 15 the suction valve 516 is normally held closed and atmosphere enters the port 512 and passing through the opening 527 in the valve operating member 520 enters the cylinder 50' through the pipe 566. The cylinder being open at one end exposes the piston on the right-hand side to high pressure (atmosphere) and the valve mechanism being connected as shown in Fig. 15 subjects the opposite side of the piston to the high pressure (atmosphere) so that when in normal position it is balanced in high pressure. When, however, the operator operated part 580 which is connected through link 587 directly to the casing 506 of the valve, is moved the high pressure valve 514 will be permitted to close under the action of the spring 519 and when the collar 520$^b$ on the valve operating member 520 engages the suction valve 516 the suction valve is moved off its seat 516$^a$ thus connecting the forward side of the cylinder 501 with the intake manifold 562 of the internal combustion engine with said cylinder through the following connections, 566, 520, 527 and 565. The differentials of pressure then existing in the cylinder will cause the closed end of the cylinder and the piston to move toward each other to simultaneously apply the brakes on the driving wheels and steering wheels through the connections 579, 574.

It is obvious that instead of connecting the operator operated part with the brake mechanism for the driving wheels, directly, when the lost motion is taken up, it may be connected in like manner to the piston (or the cylinder) of the actuator and thereby connected with the set of brake mechanism connected therewith with like effect, and in our application for Letters Patent of the United States filed November 7, 1927, and given Serial No. 231,725, we have shown several ways in which the valve mechanism can be connected to the piston or cylinder of the power actuator, and these constructions are applicable in carrying out our present invention.

While the power actuators herein shown and described are of the single acting type, it is obvious that the power actuators employed in carrying our present invention into effect may be of the double acting type, such as are disclosed for example in our former application for Letters Patent of the United States, Serial No. 163,351, filed January 25, 1927, and being a division of our earlier application Serial No. 31,281, filed May 19th, 1925, and that the cylinder and piston of such a double acting actuator can be connected independently to the respective brake mechanisms in the manner hereinbefore described and operated under the control of suitable valve mechanism such as is shown in our former application just referred to in the manner hereinbefore described, and to obtain the results of our present invention. The use of both single and double acting actuators will enable our invention to be carried out in connection with a wide variety of brake mechanisms, including some forms of brake mechanisms which would not be so readily available if the brake mechanisms were not positively relieved by the reversing movements of the piston and cylinder.

What we claim and desire to secure by Letters Patent is:—

1. In brake mechanism for an automotive vehicle, the combination with brake mechanisms for a plurality of pairs of wheels of the vehicle, of a power actuator consisting of coacting parts, all of which are movable with respect to the vehicle, and including two parts movable toward and from each other, controlling valve mechanism for the actuator, means for establishing differential fluid pressures on opposite faces of each of said actuator parts simultaneously under the control of said valve mechanism, connections from one of said actuator parts to certain of said brake mechanisms, independent connections from the other of said actuator parts to other of said brake mechanisms, said connections being constructed to apply the power of the actuator to all of said brake mechanisms simultaneously to a predetermined extent as to each, an operator operated part, operatively connected to the brake mechanisms connected to one of said actuator parts only, to enable the operator to add his physical force to the brake mechanisms connected with the operator operated part in addition to the power of the actuator without applying his physical force to the brake mechanisms connected with the other part of the actuator, and to apply the brake mechanisms connected to the operator operated part by physical force alone in case of failure of power.

2. In brake mechanism for an automotive vehicle, the combination with brake mechanisms for a plurality of pairs of wheels of the vehicle, of a power actuator consisting of coacting parts, all of which are movable with respect to the vehicle, and including two parts movable toward and from each other, controlling valve mechanism for the actuator, means for establishing differential fluid pressures on opposite faces of each of said actuator parts simultaneously under the control of said valve mechanism, connections from one of said actuator parts to certain of said brake mechanisms, independent connections from the other of said actuator parts to other of said brake mechanisms, said connections being constructed to apply the power of the actuator to all of said brake mechanisms simultaneously to a predetermined extent as to each, an operator operated part connected with said valve mechanism for operating it, and also operatively connected by means providing lost motion, with the brake mechanisms connected with one of said actuator parts, to enable the operator to apply his physical force to the brake mechanisms connected with the operator operated part in addition to the power of the actuator without applying his physical force to the brake mechanisms connected with the other actuator part, and to apply the brake mechanisms connected to the operator operated part in case of failure of power.

3. In brake mechanism for an automotive vehicle, the combination with brake mechanisms for a plurality of pairs of wheels of the vehicle including the steering wheels, of a power actuator consisting of coacting parts, all of which are movable with respect to the vehicle, and including two parts movable toward and from each other, controlling valve mechanisms for the actuator, means for establishing differential fluid pressures on opposite faces of said actuator parts simultaneously under the control of said valve mechanism, means for connecting one of said actuator parts with the steering wheel brake mechanisms, independent means for connecting the other actuator part with the other brake mechanisms, to enable all of said brake mechanisms to be applied simultaneously to a predetermined extent as to each by the power of the actuator, said connections being calibrated with the power to prevent the locking of the steering wheels by the application of the maximum power of the actuator, an operator operated part, operatively connected with the brake mechanisms other than the steering wheel brake mechanisms, to enable the operator to add his physical force to the brake mechanisms connected with the operator operated part in addition to the power of the actuator without applying additional power to the steering wheel brake mechanisms, and to apply the brake mechanisms connected to the operator operated part in case of failure of power.

4. In brake mechanism for an automotive vehicle, the combination with brake mechanisms for a plurality of pairs of wheels of the vehicle including the steering wheels, of a power actuator consisting of coacting parts, all of which are movable with respect to the vehicle, and including two parts movable toward and from each other, controlling valve mechanism for the actuator, means for establishing differential fluid pressures on opposite faces of said actuator parts simultaneously under the control of said valve mechanism, means for connecting one of said actuator parts with the steering wheel brake mechanisms, independent means for connecting the other actuator part with the other brake mechanisms, to enable all of said brake mechanisms to be applied simultaneously to a predetermined extent as to each by said power actuator, said connections being calibrated with the power to prevent the locking of the steering wheels by the application of the maximum power of the actuator, an operator operated part, connected with said valve mechanism and operatively connected by means providing lost motion, with the brake mechanisms other than the steering wheel brake mechanisms, to enable the operator to add his physical force to the brake mechanisms connected with the operator operated part in addition to the power of the actuator without applying additional power to the steering wheel brake mechanisms.

5. In brake mechanism for an automotive vehicle, the combination with brake mechanisms for a plurality of pairs of wheels of the vehicle, of a power actuator consisting of coacting parts, all of which are movable with respect to the vehicle, and including two parts movable toward and from each other, controlling valve mechanism for the actuator, means for establishing differential fluid pressures on opposite faces of each of said actuator parts simultaneously under the control of said valve mechanism, connections from one of said actuator parts to certain of said brake mechanisms, independent connections from the other of said actuator parts to other of said brake mechanisms, said connections being constructed to apply the power of the actuator to all of said brake mechanisms simultaneously to a predetermined extent as to each, the relatively movable parts of said actuator distributing the power of the actuator in the same manner at all times regardless of wear of the braking surfaces, and said actuator having a stroke of sufficient length to compensate for the wear of the braking surfaces, and an operator operated part, operatively connected to the brake mechanisms connected to one only of said actuator parts, to enable the operator to add his physical force to the brake mechanisms connected to the operator operated part.

6. In brake mechanism for an automotive vehicle, the combination with brake mechanisms for a plurality of pairs of wheels of the vehicle, of a power actuator consisting of coacting parts, all of which are movable with respect to the vehicle, and including two parts movable toward and from each other, controlling valve mechanisms for the actuator, means for establishing differential fluid pressures on opposite faces of each of said actuator parts simultaneously under the control of said valve mechanism, connections from one of said actuator parts to certain of said brake mechanisms, independent connections from the other of said actuator parts to other of said brake mechanisms, said connections being constructed to apply the power of the actuator to all of said brake mechanisms simultaneously to a predetermined extent as to each, the relatively movable parts of said actuator distributing the power of the actuator in the same manner at all times regardless of wear of the braking surfaces, and said actuator having a stroke of sufficient length to compensate for the wear of the braking surfaces, an operator operated part having a limited movement, connections between said operator operated part and said valve mechanism for operating it, said connections leading to the brake mechanisms connected with one of the actuator parts and including means providing lost motion, to enable the operator to apply his physical force to the brake mechanisms connected with the operator operated part, and a single adjusting means interposed between the operator operated part and the brake mechanisms connected therewith.

7. In brake mechanism for an automotive vehicle, the combination with brake mechanisms for a plurality of pairs of wheels of the vehicle, of a power actuator consisting of coacting parts, all of which are movable with respect to the vehicle, and including two parts movable toward and from each other, controlling valve mechanism for the actuator, means for establishing differential fluid pressures on opposite faces of each of said actuator parts simultaneously under the control of said valve mechanism, connections from one of said actuator parts to certain of said brake mechanisms, independent connections from the other of said actuator parts to other of said brake mechanisms, said connections being constructed to apply the power of the actuator to all of said brake mechanisms simultaneously to a predetermined extent as to each, the relatively movable parts of said actuator distributing the power of the actuator in the same manner at all times regardless of wear of the braking surfaces, and said actuator having a stroke of sufficient length to compensate for the wear of the braking surfaces, an operator operated part, said valve mechanism including relatively movable parts connected respectively with the operator operated part and the brake mechanisms connected with one of said actuator parts, and provided with means for limiting the lost motion between said connections, to enable the operator to apply his physical force to the said connected brake mechanisms, a stop for the portion of the valve mechanism connected with said brake mechanisms, and a single adjusting means between said portion of the valve mechanism and said connected brake mechanisms for maintaining the operator operated part operable within the limits of its movement.

8. In brake mechanism for an automotive vehicle provided with an internal combustion engine having a throttle controlled suction passage, the combination with brake mechanisms for a plurality of pairs of wheels of the vehicle, of a power actuator comprising parts movable with respect to the vehicle and movable toward and from each other, controlling valve mechanism for the actuator, means for subjecting the opposite faces of each of said actuator parts simultaneously to the suction of said suction passage and atmospheric pressure respectively under the control of said valve mechanism, connections from one of said actuator parts to certain of said brake mechanisms, independent connections from the other of said actuator parts to other of said brake mechanisms, to apply the power of the actuator to all of said brake mechanisms simultaneously to a predetermined extent as to each, said connections being calibrated with the power to prevent the locking of the wheels on dry pavement even when the vehicle is empty, the relatively movable parts of said actuator distributing the power of the acuator in the same manner at all times regardless of wear of the braking surfaces, and said actuator having a stroke of sufficient length to compensate for the wear of the braking surfaces, an operator operated part, said valve mechanism comprising relatively movable parts connected respectively with the operator operated part and with the brake mechanism connected with one of said actuator parts, means for limiting the lost motion between said connections to enable the operator to add his physical force to the brake mechanisms so connected with the operator operated part in addition to the power of the actuator to compensate for increasing loads, a stop for the portion of the valve mechanism connected with said brake mechanisms, and a single adjusting means between said portion of the valve mechanism and said connected brake mechanisms for maintaining the operator operated part operable within the limits of its movement.

9. In brake mechanism for an automotive vehicle provided with an internal combustion engine having a throttle controlled suction passage, the combination with brake mechanisms for a plurality of pairs of wheels of the vehicle, of a power actuator comprising parts movable with respect to the vehicle and movable toward and from each other, controlling valve mechanism for the actuator, means for subjecting the opposite faces of each of said actuator parts simultaneously to the suction of said suction passage and atmospheric pressure respectively under the control of said valve mechanism, connections from one of said actuator parts to certain of said brake mechanisms, independent connections from the other of said actuator parts to other of said brake mechanisms, to apply the power of the actuator to all of said brake mechanisms simultaneously to a predetermined extent as to each, the relatively movable parts of said actuator distributing the power of the actuator in the same manner at all times regardless of wear of the braking surfaces, and said actuator having a stroke of sufficient length to compensate for the wear of the braking surfaces, an operator operated part, said valve mechanism comprising relatively movable parts connected respectively with the operator operated part and with the brake mechanism connected with one of said actuator parts, yielding reactionary means interposed between the relatively movable parts of the valve mechanism in the overcoming of which by the movement of the operator operated part to operate the valve mechanism, a certain amount of physical force is applied to the brake mechanisms in addition to the power of the actuator, the said connections between the actuator parts and the brake mechanisms connected therewith being calibrated with the power to prevent the locking of the wheels of the vehicle on dry pavements even when the vehicle is lightly laden and regardless of the addition of the necessary physical force of the operator to overcome said reactionary yielding means, and means for limiting the lost motion between the connections from the valve mechanism to the operator operated part and the brake mechanisms connected therewith, whereby the full force of the operator may be applied in addition to that of the actuator, to said connected brake mechanisms to compensate for increasing loads.

10. In brake mechanism for an automotive vehicle, the combination with brake mechanisms for a plurality of pairs of wheels of the vehicle, of a power actuator comprising a cylinder connected with certain of said brake mechanisms and movable therewith, and movable with respect to the vehicle, and a piston in said cylinder movable with respect to the cylinder and with respect to the vehicle, said piston connected to certain other of said brake mechanisms and movable therewith, controlling valve mechanism for the actuator, means for establishing differential fluid pressures on opposite faces of said piston under control of said valve mechanism, said connections being constructed to apply the power of the actuator to all of said brake mechanisms simultaneously to a predetermined extent as to each, an operator operated part, operatively connected to the brake mechanisms connected to one of said actuator parts, to enable the operator to apply his physical force to the brake mechanisms connected with the operator operated part in addition to any power exerted by the actuator without applying his physical force to the brake mechanisms connected with the other part of the actuator.

11. In brake mechanism for an automotive vehicle, the combination with brake mechanisms for a plurality of pairs of wheels of the vehicle, of a power actuator comprising a cylinder connected with certain of said brake mechanisms and movable therewith, and movable with respect to the vehicle, and a piston in said cylinder movable with respect to the cylinder and with respect to the vehicle, said piston connected to certain other of said brake mechanisms and movable therewith, controlling valve mechanism for the actuator, means for establishing differential fluid pressures on opposite faces of said piston under the control of said valve mechanism, said connections being constructed to apply the power of the actuator to all of said brake mechanisms simultaneously to a predetermined extent as to each, an operator operated part connected with said valve mechanism for operating it, and operatively connected to the brake mechanisms connected to one of said actuator parts, by means providing lost motion, to enable the operator to apply his physical force to the brake mechanisms connected to the operator operated part in addition to any power exerted by the actuator without applying his physical force to the brake mechanisms connected to the other part of the actuator.

12. In brake mechanism for an automotive vehicle provided with an internal combustion engine having a throttle controlled suction passage, the combination with brake mechanisms for a plurality of pairs of wheels of the vehicle, of a power actuator comprising a cylinder, connections therefrom to certain of said brake mechanisms and movable therewith, and movable with respect to the vehicle, and a piston in said cylinder movable with respect to the cylinder and with respect to the vehicle, connections from said piston to certain other of said brake mechanisms and movable therewith, controlling valve mechanism for the actuator, connections from said cylinder to the suction passage of the engine and to the atmosphere for establishing differential fluid pressures on opposite faces of said piston under the control of said valve mechanism, the connections from said actuator to said brake mechanisms being constructed to apply the power of the actuator to all of said brake mechanisms simultaneously to a predetermined extent as to each, an operator operated part, operatively connected to the brake mechanisms connected to one of said actuator parts to enable the operator to apply his physical force to the brake mechanisms connected with the operator operated part in addition to any power exerted by the actuator, without applying his physical force to the brake mechanisms connected with the other part of the actuator.

13. In brake mechanism for an automotive vehicle provided with an internal combustion engine having a throttle controlled suction passage, the combination with brake mechanisms for a plurality of pairs of wheels of the vehicle, of a power actuator comprising a cylinder connected with certain of said brake mechanisms and movable therewith, and movable with respect to the vehicle, and a piston in said cylinder movable with respect to the cylinder and with respect to the vehicle and connected to certain other of said brake mechanisms and movable therewith, controlling valve mechanism for the actuator, connections from said cylinder to the suction passage of the engine and to the atmosphere for establishing differential fluid pressures on opposite faces of said piston under the control of said valve mechanism said connections being constructed to apply the power of the actuator to all of said brake mechanisms simultaneously to a predetermined extent as to each, an operator operated part, a connection therefrom to said valve mechanism for operating it, a connection from said valve mechanism to the brake mechanisms connected to one of said actuator parts, said connections providing lost motion, to enable the operator to apply his physical force to the brake mechanisms connected to the operator operated part in addition to any power exerted by the actuator, without applying his physical force to the brake mechanisms connected to the other part of the actuator.

14. In brake mechanism for an automotive vehicle, the combination with brake mechanisms for a plurality of pairs of wheels of the vehicle including the steering wheels, of a power actuator comprising a cylinder movably supported with respect to the chassis of the vehicle, and a piston movable therein, controlling valve mechanism for the actuator, means for establishing differential fluid pressures on opposite faces of the piston under the control of said valve mechanism, said cylinder and said piston being independently connected, the one with brake mechanisms for the steering wheels and the other with brake mechanisms for wheels other than the steering wheels, for simultaneously applying the power of the actuator to all of said brake mechanisms to a predetermined extent as to each, said connections to the steering wheel brake mechanisms being calibrated with the power to prevent the locking of the steering wheels by the application of the power of the actuator to the maximum extent, an operator operated part, operatively connected to the brake mechanisms other than the steering wheel brake mechanisms, to enable the operator to add his physical force to the brake mechanisms connected with the operator operated part in addition to any power exerted by the actuator, without applying additional force to the brake mechanisms for the steering wheels.

15. In brake mechanism for an automotive vehicle, the combination with brake mechanisms for a plurality of pairs of wheels of the vehicle including the steering wheels, of a power actuator comprising a cylinder movably supported with respect to the chassis of the vehicle, and a piston movable therein, controlling valve mechanism for the actuator, means for establishing differential fluid pressures on opposite faces of the piston under the control of said valve mechanism, said cylinder and said piston being independently connected, the one with brake mechanisms for the steering wheels and the other with brake mechanisms for wheels other than the steering wheels, for simultaneously applying the power of the actuator to all of said brake mechanisms to a predetermined extent as to each, said connections to the steering wheel brake mechanisms being calibrated with the power to prevent the locking of the steering wheels by the application of the power of the actuator to the maximum extent, an operator operated part connected with said valve mechanism, and operatively connected to the brake mechanisms for wheels other than the steering wheels, to enable the operator to apply his physical force to the brake mechanisms connected with the operator operated part in addition to any power exerted by the actuator, without applying additional force to the brake mechanisms for the steering wheels.

16. In brake mechanism for an automotive vehicle, the combination with brake mechanisms for a plurality of pairs of wheels of the vehicle including the steering wheels, of a power actuator comprising a cylinder movably supported with respect to the chassis of the vehicle, and a piston movable therein, controlling valve mechanism for the actuator, means for establishing differential fluid pressures on opposite faces of the piston under the control of said valve mechanism, said cylinder and said piston being independently connected, the one with brake mechanisms for the steering wheels and the other with brake mechanisms for wheels other than the steering wheels, for simultaneously applying the power of the actuator to all of said brake mechanisms to a predetermined extent as to each, said connections to the steering wheel brake mechanisms being calibrated with the power to prevent the locking of the steering wheels by the application of the power of the actuator to the maximum extent, an operator operated part having a limited movement operatively connected to the brake mechanisms other than the steering wheel brake mechanisms, to enable the operator to add his physical force to the brake mechanisms connected with the operator operated part in addition to any power exerted by the actuator, without applying additional force to the brake mechanisms for the steering wheels, said cylinder and piston forming an equalizing means to distribute the power of the actuator to the respective brake mechanisms regardless of the wear of braking surfaces, and said piston having a sufficient stroke to compensate for the wear of said braking surfaces, and single adjusting means in the connections between the operator operated part and the brake mechanisms connected therewith.

17. In brake mechanism for an automotive vehicle provided with an internal combustion engine having a throttle controlled suction passage, the combination with brake mechanism for a plurality of pairs of wheels of the vehicle including the steering wheels, of a power actuator comprising a cylinder movably supported with respect to the chassis of the vehicle, and a piston movable therein, controlling valve mechanism for the actuator, means for connecting the cylinder with the suction passage of the engine and with the atmosphere for establishing differential fluid pressures on opposite faces of the piston under the control of said valve mechanism, said cylinder and said piston being independently connected, the one with brake mechanism for the steering wheels and the other with brake mechanism for wheels other than the steering wheels, for simultaneously applying the power of the actuator to all of said brake mechanism to a predetermined extent as to each, said connections to the steering wheel brake mechanism being calibrated with the power to prevent the locking of the steering wheels by the application of the power of the actuator to the maximum extent, an operator operated part having a limited movement operatively connected to the brake mechanism other than the steering wheel brake mechanism, to enable the operator to add his physical force to the brake mechanism connected with the operator operated part in addition to any power exerted by the actuator, without applying additional force to the brake mechanism for the steering wheels, said cylinder and piston forming an equalizing means to distribute the power of the actuator to the respective brake mechanism regardless of the wear of braking surfaces, and said piston having a sufficient stroke to compensate for the wear of said braking surfaces, and single adjusting means in the connections between the operator operated part and the brake mechanism connected therewith.

18. In brake mechanism for an automotive vehicle, the combination with brake mechanisms for a plurality of pairs of wheels of the vehicle including the steering wheels, of a power actuator comprising a cylinder movably supported with respect to the chassis of the vehicle, and a piston movable therein, controlling valve mechanism for the actuator, means for establishing differential fluid pressures on opposite faces of the piston under the control of said valve mechanism, said cylinder and said piston being independently connected, the one with brake mechanisms for the steering wheels and the other with brake mechanisms for wheels other than the steering wheels, for simultaneously applying the power of the actuator to all of said brake mechanisms to a predetermined extent as to each, said connections to the steering wheel brake mechanisms being calibrated with the power to prevent the locking of the steering wheels by the application of the power of the actuator to the maximum extent, an operator operated part having a limited movement connected with said valve mechanism, and operatively connected to the brake mechanisms for wheels other than the steering wheels, to enable the operator to apply his physical force to the brake mechanisms connected with the operator operated part in addition to any power exerted by the power actuator, without applying additional force to the brake mechanisms for the steering wheels, said cylinder and piston forming an equalizing means to distribute the power of the actuator to the brake mechanisms regardless of wear of the braking surfaces, and adjusting means in the connections between the operator operated part and the brake mechanisms connected therewith.

19. In brake mechanism for an automotive vehicle provided with an internal combustion engine having a throttle controlled suction passage, the combination with brake mechanism for a plurality of pairs of wheels of the vehicle including the steering wheels, of a power actuator comprising a cylinder movably supported with respect to the chassis of the vehicle, and a piston movable therein, controlling valve mechanism for the actuator, means for connecting the cylinder with the suction passage of the engine and with the atmosphere for establishing differential fluid pressures on opposite faces of the piston under the control of said valve mechanism, said cylinder and said piston being independently connected, the one with brake mechanism for the steering wheels and the other with brake mechanism for wheels other than the steering wheels, for simultaneously applying the power of the actuator to all of said brake mechanism to a predetermined extent as to each, said connections to the steering wheel brake mechanism being calibrated with the power to prevent the locking of the steering wheels by the application of the power of the actuator to the maximum extent, an operator operated part having a limited movement connected with said valve mechanism, and operatively connected to the brake mechanism for wheels other than the steering wheels, to enable the operator to apply his physical force to the brake mechanism connected with the operator operated part in addition to any power exerted by the power actuator, without applying additional force to the brake mechanism for the steering wheels, said cylinder and piston forming an equalizing means to distribute the power of the actuator to the brake mechanism regardless of wear of the braking surfaces, and adjusting means in the connections between the operator operated part and the brake mechanism connected therewith.

20. In brake mechanism for an automotive vehicle, the combination with brake mechanisms for a plurality of pairs of wheels of the vehicle including the steering wheels, of a power actuator comprising a cylinder closed at both ends and movable with respect to the vehicle, and a piston in said cylinder, controlling valve mechanism for the actuator, means for connecting the cylinder with sources of higher and lower fluid pressures under the control of said valve mechanism being constructed to normally maintain the cylinder on both faces of the piston in communication with the source of lower fluid pressure, when the valve mechanism is in released position, and to admit the higher fluid pressure to the cylinder on one side of the piston to produce a power stroke of the piston and cylinder, said cylinder and piston being connected respectively to the steering wheel brake mechanisms and to the brake mechanisms for the other wheels of the vehicle, to apply all of said brake mechanisms simultaneously to a predetermined extent, the connections to the steering wheel brake mechanisms being calibrated with the power to prevent locking the steering wheels by the operation of the power actuator to its maximum extent, an operator operated part, operatively connected to the brake mechanisms for wheels other than the steering wheels, to enable the operator to apply his physical force to said brake mechanisms without applying additional force to the brake mechanisms for the steering wheels.

21. In brake mechanism for an automotive vehicle, the combination with brake mechanisms for a plurality of pairs of wheels of the vehicle including the steering wheels, of a power actuator comprising a cylinder closed at both ends and movable with respect to the vehicle, and a piston in said cylinder, controlling valve mechanism for the actuator, means for connecting the cylinder with sources of higher and lower fluid pressures under the control of said valve mechanism being constructed to normally maintain the cylinder on both faces of the piston in communication with the source of lower fluid pressures, when the valve mechanism is in retracted position, and to admit the higher fluid pressures to the cylinder on one side of the piston to produce a power stroke of the piston and cylinder, said cylinder and piston being coupled respectively to the steering wheel brake mechanisms and to the brake mechanisms for the other wheels of the vehicle, to apply all of said brake mechanisms simultaneously to a predetermined extent, the coupling to the steering wheel brake mechanisms being calibrated with the power to prevent locking the steering wheels by the operation of the power actuator to its maximum extent, an operator operated part connected with said valve mechanism and operatively connected to the brake mechanism for wheels other than the steering wheels by means providing for lost motion, to enable the operator to apply his physical force to said brake mechanisms without applying additional force to the steering wheel brake mechanisms.

22. In brake mechanism for an automotive vehicle provided with an internal combustion engine having a throttle controlled suction passage, the combination with brake mechanisms for a plurality of pairs of wheels of the vehicle including the steering wheels, of a power actuator comprising a cylinder movable with respect to the vehicle, a piston in said cylinder, controlling valve mechanism for the actuator, means for connecting a portion of the cylinder between the piston and one end of the cylinder with said suction passage and with a source of higher fluid pressure under the control of said valve mechanism, said cylinder and piston being connected independently, respectively with the steering wheel brake mechanisms and brake mechanisms for other than the steering wheels, said connections being constructed to apply the power of the actuator simultaneously to all the brake mechanisms to a predetermined extent as to each, an operator operated part, operatively connected to the brake mechanisms for wheels other than the steering wheels, to enable the operator to apply his physical force to said brake mechanisms in addition to any force exerted by the actuator, without applying additional force to the brake mechanisms for the steering wheels, the application of power of the actuator by a movement of the cylinder and piston, permitting the use of a relatively smaller cylinder and piston, and reducing the quantity of higher pressure fluid delivered from the cylinder to the suction passage of the engine.

23. In brake mechanism for an automotive vehicle provided with an internal combustion engine having a throttle controlled suction passage, the combination with brake mechanisms for a plurality of pairs of wheels of the vehicle including the steering wheels, of a power actuator comprising a cylinder movable with respect to the vehicle, a piston in said cylinder, controlling valve mechanism for the actuator, means for connecting a portion of the cylinder between the piston and one end of the cylinder with said suction passage and with a source of higher fluid pressure under the control of said valve mechanism, said cylinder and piston being coupled independently, respectively with the steering wheel brake mechanisms and brake mechanisms for other than the steering wheels, for applying the power of the actuator simultaneously to all the brake mechanisms to a predetermined extent as to each, said couplings being constructed to fully apply the brakes by a shorter stroke of the piston than the maximum stroke permitted by the length of the cylinder, to permit a longer travel stroke of the piston to compensate for the wear of the friction surfaces, the application of power by the movement of both cylinder and piston permitting the use of a relatively smaller cylinder and piston, and compensating for the increased amount of air required for the longer stroke of the piston to compensate for wear of the friction surfaces, an operator operated part operatively connected to the brake mechanism for wheels other than the steering wheels, to enable the operator to apply his physical force to said brake mechanisms in addition to any force exerted by the actuator without applying additional force to the brake mechanisms for the steering wheels.

24. In brake mechanism for an automotive vehicle provided with an internal combustion engine having a throttle controlled suction passage, the combination with brake mechanisms for a plurality of pairs of wheels of the vehicle including the steering wheels, of a power actuator comprising a cylinder closed at both ends, and movable with respect to the vehicle, a piston in said cylinder, controlling valve mechanism for the actuator, means for connecting the cylinder on one side of the piston with the suction passage of the engine, means for connecting the cylinder on the other side of the piston with the suction passage of the engine and with a source of higher fluid pressure under the control of said valve mechanism, said cylinder and piston being connected respectively, the one to the steering wheel brake mechanisms and the other with brake mechanisms for wheels other than the steering wheels, said connections being constructed to apply the power of the actuator simultaneously to all of said brake mechanisms to a predetermined extent, and the connections to the steering wheel brake mechanisms being calibrated with the power to prevent the locking of the steering wheels by the application of the maximum power of the actuator, an operator operated part connected with said valve mechanism for operating it, and operatively connected by means providing lost motion with the brake mechanisms other than the steering wheel brake mechanisms to permit the operator to apply his physical force to said brake mechanisms in addition to any force exerted by the actuator, without applying additional force to the brake mechanisms for the steering wheels.

25. In brake mechanism for an automotive vehicle provided with an internal combustion engine having a throttle controlled suction passage, the combination with brake mechanisms for a plurality of pairs of wheels of the vehicle including the steering wheels, of a power actuator comprising a cylinder closed at both ends, and movable with respect to the vehicle, a piston in said cylinder, controlling valve mechanism for the actuator, means for connecting the cylinder on one side of the piston with the suction passage of the engine, means for connecting the cylinder on the other side of the piston with the suction passage of the engine and with a source of higher fluid pressure under the control of said valve mechanism, said cylinder and piston being coupled respectively, the one to the steering wheel brake mechanisms and the other with brake mechanisms for wheels other than the steering wheels, said couplings being constructed to apply the power of the actuator simultaneously to all of said brake mechanisms to a predetermined extent, and the couplings to the steering wheel brake mechanisms being calibrated with the power to prevent the locking of the steering wheels by the application of the maximum power of the actuator, the application of power of the actuator by movements of the cylinder and piston permitting the use of a relatively smaller cylinder and piston, and reduction in the quantity of higher pressure fluid delivered to the suction passage of the engine and facilitating the starting of the engine, an operator operated part connected with said valve mechanism for operating it, and operatively connected by means providing lost motion with the brake mechanisms other than the steering wheel brake mechanisms to permit the operator to apply his physical force to said brake mechanisms in addition to any force exerted by the actuator, without applying additional force to the brake mechanisms for the steering wheels.

26. In brake mechanism for an automotive vehice provided with an internal combustion engine having a throttle controlled suction passage, the combination with brake mechanisms for a plurality of pairs of wheels of the vehicle including the steering wheels, of a power actuator comprising a cylinder closed at both ends, and movable with respect to the vehicle, a piston in said cylinder, controlling valve mechanism for the actuator, means for connecting the cylinder on one side of the piston with the suction passage of the engine, means for connecting the cylinder on the other side of the piston with the suction passage of the engine and with a source of higher fluid pressure under the control of said valve mechanism, said cylinder and piston being connected respectively, the one to the steering wheel brake mechanisms and the other with brake mechanisms for wheels other than the steering wheels, said connections being constructed to apply the power of the actuator simultaneously to all of said brake mechanisms to a predetermined extent, and the connections to the steering wheel brake mechanisms being calibrated with the power to prevent the locking of the steering wheels by the application of the maximum power of the actuator, an operator operated part connected with said valve mechanism for operating it, and operatively connected by means providing lost motion with the brake mechanisms other than the steering wheel brake mechanisms to permit the operator to apply his physical force to said brake mechanisms in addition to any force exerted by the actuator, without applying additional force to the brake mechanisms for the steering wheels, said cylinder and piston forming an equalizing means for applying the power of the actuator to all the brake mechanisms to the predetermined extent regardless of the wear of the braking surfaces, and said piston having a sufficient length of stroke to compensate for the wear of the braking surfaces, and an adjusting means in the connections between the operator operated part and the brake mechanisms connected therewith.

27. In brake mechanism for an automotive vehicle provided with an internal combustion engine having a throttle controlled suction passage, the combination with brake mechanisms for a plurality of pairs of wheels of the vehicle including the steering wheels, of a power actuator comprising a cylinder closed at both ends, and movable with respect to the vehicle, a piston in said cylinder, controlling valve mechanism for the actuator, means for connecting the cylinder on one side of the piston with the suction passage of the engine, means for connecting the cylinder on the other side of the piston with the suction passage of the engine and with a source of higher fluid pressure under the control of said valve mechanism, said valve mechanism being constructed to connect the portions of the cylinder on both sides of the piston with each other and with the source of suction when the valve mechanism is in the released position, to equalize pressures within the cylinder and permit air to be exhausted, said cylinder and piston being connected respectively, the one to the steering wheel brake mechanisms and the other with brake mechanisms for wheels other than the steering wheels, said connections being constructed to apply the power of the actuator simultaneously to all of said brake mechanisms to a predetermined extent, and the connections to the steering wheel brake mechanisms being calibrated with the power to prevent the locking of the steering wheels by the application of the maximum power of the actuator, an operator operated part connected with said valve mechanism for operating it, and operatively connected by means providing lost motion with the brake mechanisms other than the steering wheel brake mechanisms to permit the operator to apply his physical force to said brake mechanisms in addition to any force exerted by the actuator, without applying additional force to the brake mechanisms for the steering wheels, said cylinder and piston forming an equalizing means for applying the power of the actuator to all the brake mechanisms to the predetermined extent regardless of the wear of the braking surfaces, and said piston having a sufficient length of stroke to compensate for the wear of the braking surfaces, and an adjusting means in the connections between the operator operated part and the brake mechanisms connected therewith.

28. In brake mechanism for an automotive vehicle provided with an internal combustion engine having a throttle controlled suction passage, the combination with brake mechanisms for a plurality of pairs of wheels of the vehicle including the steering wheels, of a power actuator comprising a cylinder closed at both ends, and movable with respect to the vehicle, a piston in said cylinder, controlling valve mechanism for the actuator, means for connecting the cylinder on one side of the piston with the suction passage of the engine, means for connecting the cylinder on the other side of the piston with the suction passage of the engine and with a source of higher fluid pressure under the control of said valve mechanism, said cylinder and piston being connected respectively, the one to the steering wheel brake mechanisms and the other with brake mechanisms for wheels other than the steering wheels, said connections being constructed to apply the power of the actuator simultaneously to all of said brake mechanisms to a predetermined extent, and the connections to the steering wheel brake mechanisms being calibrated with the power to prevent the locking of the steering wheels by the application of the maximum power of the actuator, an operator operated part, said controlling valve mechanism comprising relatively movable parts connected respectively with the operator operated part and with the brake mechanisms other than the steering wheel brake mechanisms, means providing lost motion between said connections, to permit the operator to apply his physical force to said connected brake mechanisms in addition to any force exerted by the actuator without applying additional force to the brake mechanisms for the steering wheels, said cylinder and piston forming an equalizing means for applying the power of the actuator to all the brake mechanisms to the predetermined extent regardless of the wear of the braking surfaces, and said piston having a sufficient length of stroke to compensate for the wear of the braking surfaces, a stop for the portion of the valve mechanism connected with brake mechanism for arresting it in the released position, and a single adjusting means between said portion of the valve mechanism and the brake mechanism connected therewith.

29. In brake mechanism for an automotive vehicle, the combination with brake mechanism for a plurality of pairs of wheels of the vehicle, of a power actuator comprising a cylinder movable with respect to the vehicle, and a piston in said cylinder movable with respect to the cylinder and with respect to the vehicle, controlling valve mechanism for the actuator, means for establishing differential fluid pressures on opposite faces of said piston under the control of said valve mechanism, connections from said piston to certain of said brake mechanism, movable supporting arms, connected with the vehicle for supporting the cylinder and piston, while permitting the movement of both with respect to the vehicle and each other, and operative connections between the cylinder and other brake mechanism of the vehicle and an operator operated part arranged to control the valve mechanism and to apply the physical force of the operator to one of said brake mechanism.

30. In brake mechanism for an automotive vehicle, the combination with brake mechanism for a plurality of pairs of wheels of the vehicle, of a power actuator comprising a cylinder movable with respect to the vehicle, and a piston in said cylinder movable with respect to the cylinder and with respect to the vehicle, controlling valve mechanism for the actuator, means for establishing differential fluid pressures on opposite faces of said piston under the control of said valve mechanism, connections from said piston to certain of said brake mechanism, movable supporting arms, connected with the vehicle for supporting the cylinder and piston, while permitting the movement of both with respect to the vehicle and each other, and operative connections between said supporting arms and other brake mechanism of the vehicle together with an operator operated part connected to one brake mechanism only.

31. In brake mechanism for an automotive vehicle, the combination with brake mechanism for a plurality of pairs of wheels of the vehicle, of a power actuator comprising a cylinder movable with respect to the vehicle, and a piston in said cylinder movable with respect to the cylinder and with respect to the vehicle, controlling valve mechanism for the actuator, means for establishing differential fluid pressures on opposite faces of said piston under the control of said valve mechanism, connections from said piston to certain of said brake mechanism, movable supporting arms, connected with the vehicle for supporting the cylinder and piston, while permitting the movement of both with respect to the vehicle and each other, and operative connections between the cylinder and other brake mechanism of the vehicle, an operator operated part, operatively connected with the brake mechanism connected to one of said actuator parts, to enable the operator to apply his physical force to the brake mechanism connected to the operator operated part in addition to any power exerted by the actuator without applying his physical force to the brake mechanism connected to the other part of the actuator.

32. In brake mechanism for an automotive vehicle, the combination with brake mechanism for a plurality of pairs of wheels of the vehicle, of a power actuator comprising a cylinder movable with respect to the vehicle, and a piston in said cylinder movable with respect to the cylinder and with respect to the vehicle, controlling valve mechanism for the actuator, means for establishing differential fluid pressures on opposite faces of said piston under the control of said valve mechanism, connections from said piston to certain of said brake mechanism, movable supporting arms, connected with the vehicle for supporting the cylinder and piston, while permitting the movement of both with respect to the vehicle and each other, and operative connections between said supporting arms and other brake mechanism of the vehicle, an operator operated part, operatively connected to one of said actuator parts, to enable the operator to apply his physical force to the brake mechanism connected to the operator operated part in addition to any power exerted by the actuator without applying his physical force to the brake mechanism connected to the other part of the actuator.

In testimony whereof we affix our signatures.

CALEB S. BRAGG.
VICTOR W. KLIESRATH.